United States Patent [19]

Takeuchi et al.

[11] Patent Number: 4,683,560
[45] Date of Patent: Jul. 28, 1987

[54] MICROPROCESSOR CONTROLLED FOCUSSING SERVO ACQUISITION

[75] Inventors: Toyoaki Takeuchi; Ken Ohshima; Hideyuki Kenjyo; Yoshiaki Ikeda; Masaharu Sakamoto, all of Tokyo, Japan

[73] Assignee: Olympus Optical Company, Ltd., Tokyo, Japan

[21] Appl. No.: 561,631

[22] Filed: Dec. 15, 1983

[30] Foreign Application Priority Data

Dec. 23, 1982 [JP] Japan ................. 57-232035

[51] Int. Cl.⁴ .............................................. G11B 7/095
[52] U.S. Cl. ........................................ 369/45; 369/46; 250/201
[58] Field of Search ............................ 369/44, 45, 46; 250/201 DF

[56] References Cited

U.S. PATENT DOCUMENTS

| 4,280,215 | 7/1981 | Okano | 250/201 DF |
| 4,344,165 | 8/1982 | Akiyama | 369/44 |
| 4,368,526 | 1/1983 | Harigae et al. | |
| 4,439,848 | 3/1984 | Ceshkovsky et al. | |
| 4,446,546 | 4/1984 | Miller | 369/46 |
| 4,475,182 | 10/1984 | Hosaka | 369/46 |
| 4,497,047 | 1/1985 | Fujiie et al. | 369/45 |
| 4,544,837 | 10/1985 | Tanaka et al. | 369/45 |

FOREIGN PATENT DOCUMENTS 55-108939  8/1980  Japan .
56-94528   7/1981  Japan .

OTHER PUBLICATIONS

K. P. Kolakowski, Adaptive Gain Tracking of a Sampled Channel IBM TDB vol. 21, No. 10, Mar.1979, p. 4195.
F. C. Gibeau et al., Track Following Pattern and Detection IBM TDB vol. 13, No. 11, Apr. 1971, pp. 3386-3387.

Primary Examiner—Raymond F. Cardillo
Assistant Examiner—James E. Tomassini
Attorney, Agent, or Firm—Frishauf, Holtz, Goodman & Woodward

[57] ABSTRACT

In an auto-focussing system, an actuator which moves together with an objective lens is vertically movable against a rotating optical disc and radiates a light beam so as to form a light spot on an information plane of the disc. A focus servo unit moves the actuator so that an optical distance between the actuator and the disc is within a proper distance region and performs the focus control of the light spot on the disc. While the actuator is approaching the optical disc, an auto-focus/focus servo controller initially makes the servo unit nonoperative and, when the actuator reaches a too-far position in a suitable servo loop distance region specified by a servo loop of the focus servo unit, the controller temporarily stops the movement of the actuator and then moves the actuator again from the too-far position by only a predetermined distance, thereby causing the actuator to be located within the focus loop distance region.

10 Claims, 8 Drawing Figures

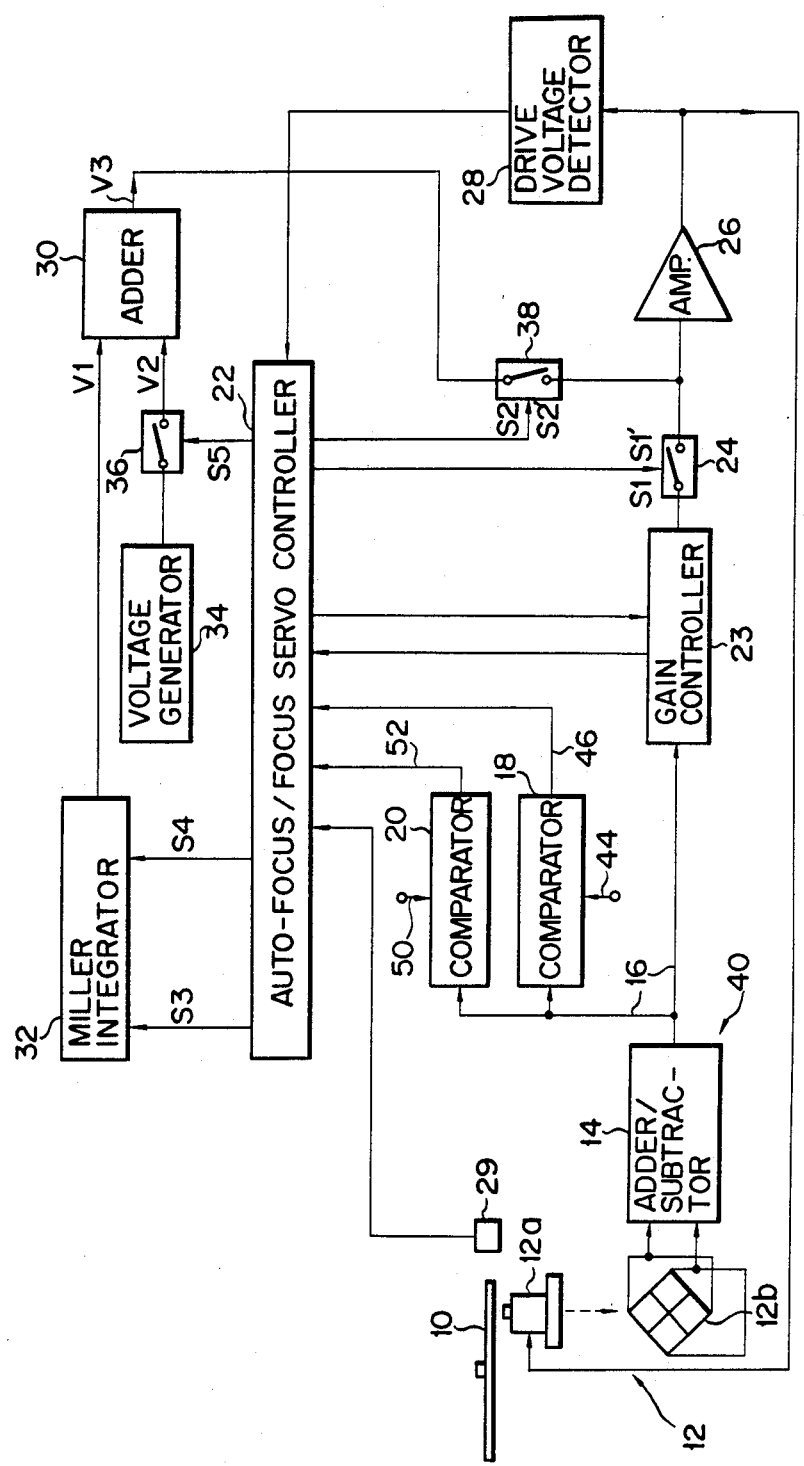
F I G. 1

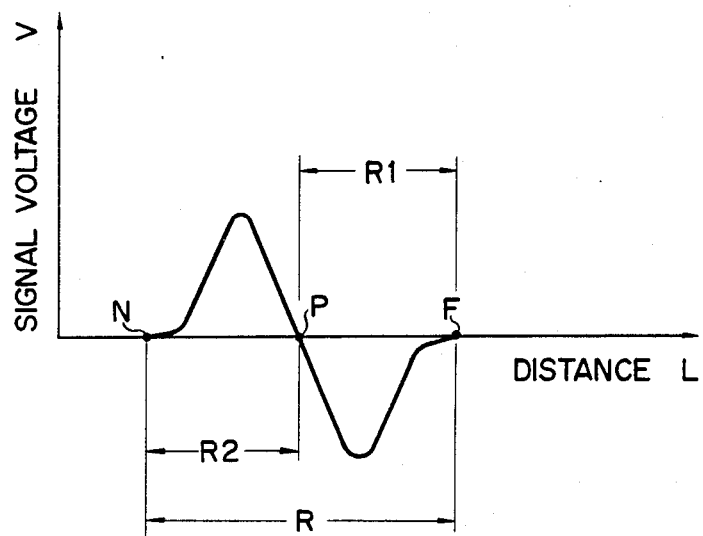
FIG. 2
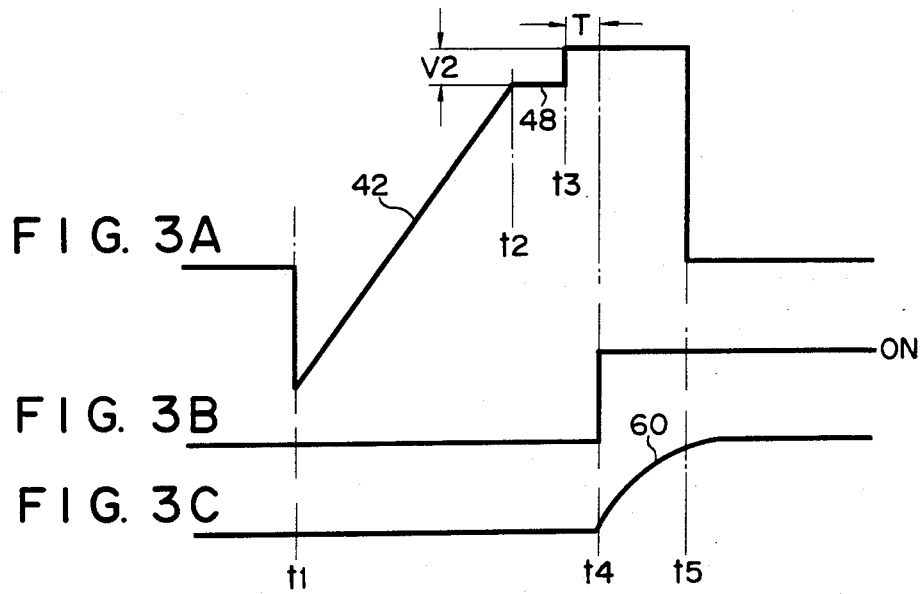
FIG. 3A
FIG. 3B
FIG. 3C

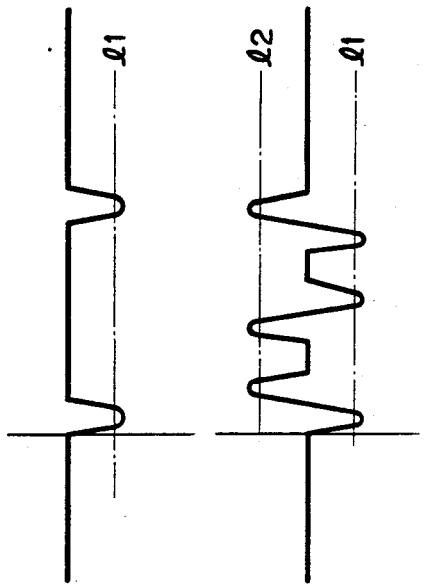
FIG. 4A
FIG. 4B
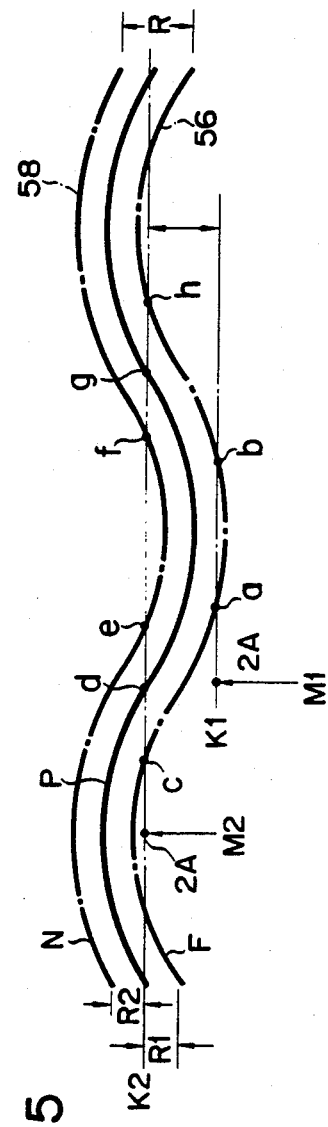
FIG. 5

MICROPROCESSOR CONTROLLED FOCUSSING SERVO ACQUISITION

BACKGROUND OF THE INVENTION

The present invention relates to an auto-focussing system to be employed in an optical type information record/reproduction system for recording/reproducing information to/from a disk-shaped optical type record carrier body.

One of the most important techniques when reading or writing information from or onto, respectively, an optical type record carrier body, such as an optical disc, is to suitably form a light beam spot on the information plane of the disc. In the optical type information record/reproduction (used throughout this specification as an abbreviation for "record and reproduction") system, a focussing servo unit is provided for allowing an objective lens to properly follow the surface oscillation of the information plane of the disc which is caused when the disc rotates, thereby controlling the light spot to be accurately formed on the information plane. The position of the optical system including this objective lens is controlled in the manner such that the distance between the information plane and this optical system is always set to a value within a proper range in dependence upon the surface oscillation of the disc. A search system unit is provided for automatically placing the objective lens within a focus pull-in (retractable) range of the above-mentioned servo unit.

However, with conventional techniques it is impossible to sufficiently and effectively perform the task of positioning the objective lens in order to focus the light spot on the disc information plane. For example, according to an optical type information record/reproduction apparatus as disclosed in a Japanese Patent Disclosure (KOKAI) No. 108939/80, when the objective lens approaches the rotating optical disc and enters the focus pull-in range of the servo unit, a control signal is generated from a predetermined circuit section to stop the movement of this lens. Thereafter the objective lens is pulled in by the servo unit.

In such a conventional arrangement, if the optical system malfunctions, even when the objective lens is positioned in the pull-in range, the circuit section still remains non-operative, whereby a lens-movement-stop signal will not be produced. The lens will continue to move toward the disc and an optimum focussing of the light spot is not achieved. In the worst case, the lens will come into contact with the rotating disc, causing damage to the hardware of the apparatus.

According to U.S. Pat. No. 4,368,526, a technique is disclosed whereby when a constant time passes after the focus servo loop for the optical disc had been closed and at the same time the servo open loop gain had been set into the full gain, the supply of a focus searching voltage to the servo system is stopped. According to this reference, the system is arranged such that a focus error signal is always monitored and the focus servo system is closed when the level of this signal exceeds a predetermined threshold level. However, even if this technique is used, there is still a danger such that, for example, when a malfunction occurs in the optical system, the objective lens will collide with the surface of the rotating disc.

SUMMARY OF THE INVENTION

It is therefore an object of the present invention to provide a new and improved auto-focussing system which suitably performs the position control of an objective lens to position a light spot so that it is focussed on an information plane of an optical type record carrier body while enabling the lens to be moved safely into a focus pull-in range of a servo loop.

In an auto-focussing system of the present invention, a light radiator device is substantially vertically movable against the information record carrier body and radiates a light beam so as to form a light spot on the information plane. A servo device moves the light radiator device so that an optical distance between the light radiator device and the record carrier body is within a proper distance region and performs the focus control of the light spot on the record carrier body. In the situation such that the light radiator device approaches the record carrier body, a controller device first makes the focus servo device nonoperative. When the light radiator device reached a first position corresponding to a too-far position in the suitable servo loop distance region to be specified by the servo loop of the focus servo device, the controller device temporarily stops the movement of the light radiator device and permits the light radiator device to further move by only a predetermined distance from this first position so as to be located in a second position, thereby allowing the light radiator device to be located within the focus loop distance region.

BRIEF DESCRIPTION OF THE DRAWINGS

The present invention is best understood by reference to the accompanying drawings, in which:

FIG. 1 is a block diagram illustrating the overall configuration of an auto-focussing system according to a preferred embodiment of this invention;

FIG. 2 is a graph representing a focus servo open loop characteristic of the auto-focussing system of FIG. 1;

FIGS. 3A to 3C are waveform diagrams respectively showing changes in the potentials to be caused in main parts of the system of FIG. 1;

FIGS. 4A and 4B are diagrams respectively showing waveforms of focus error signals which are detected by a photodetector included in the system of FIG. 1 and are produced when the relative optical distances between an actuator and an optical disc are different; and FIG. 5 is a diagrammatical view showing an oscillation of a focus pull-in range R of a servo loop due to surface oscillation of the rotating disc.

DETAILED DESCRIPTION OF THE PREFERRED EMBODIMENT

In an auto-focussing system preferably utilized in an optical type information record/reproduction apparatus as shown in FIG. 1, an optical disc 10 is rotatably mounted in a well known manner. An optical system 12 is part of this system and includes a focussing magnetic circuit unit or actuator 12a for an objective lens (not shown) and a pinphotodetector section 12b having four light sensitive diodes to optically record/reproduce desired information on/from the optical-disc 10. Output signals from the photodetector 12b are suitably added and subtracted by an adder/subtractor 14 to produce a focus-error signal on line 16. This signal is supplied through first and second comparators 18 and 20 to an auto-focus/focus servo control unit 22. This signal on line 16 is also fed back to the actuator 12a through a gain controller 23, analog switch 24 and drive amplifier 26. An output of the amplifier 26 is connected to the controller 22 through a drive voltage detector 28 to detect the present position of the actuator 12a.

The controller 22 comprises a CPU or microprocessor which receives, as a clock signal, an output signal from a detector 29 positioned close to the optical disc 10 for detecting the rotation of the disc. Controller 22 controls all of the necessary operations of the whole system with respect to the auto-focus/focus servo operation, as explained below in detail. Therefore, the controller 22 serves to communicate with main constituent parts of the auto-focussing system of FIG. 1.

A Miller integrator 32 for selectively performing the charging, discharging and holding operations is connected to the controller 22 and supplies an output signal to a first input terminal of an adder circuit 30. A voltage setting device or voltage generator 34, which generates a voltage signal having a preselected voltage level (explained below in detail), is connected to a second input of the adder 30 through an analog switch 36 which is turned ON/OFF under the control of the controller 22. An output of this adder 30 is similarly connected to an input terminal of the amplifier 26 through an analog switch 38 which is turned ON/OFF under the control of the controller 22.

The actuator 12a, photodetector 12b, adder/subtractor circuit 14, gain controller 23, analog switch 24, and amplifier 26 constitute a focus servo unit 40. This focus servo unit 40 automatically controls the optical distance between the information plane (not shown) of the rotating optical disc 10 and the actuator 12a in such a manner as to be always within a predetermined range, as explained below in detail. In the system of FIG. 1, a search unit for automatically introducing the actuator 12a within a focus pull-in range of the servo loop of the focus servo unit 40 is constituted by the controller 22, Miller integrator 32, voltage generator 34, analog switches 36, 38, adder 30, etc.

The term "focus pull-in range of the servo loop" is defined as follows in the present specification. FIG. 2 is a focus servo open loop characteristic diagram showing a correlation between a distance L between the information plane of the rotating disc 10 and the actuator 12a and a voltage level of the focus-error signal 16 to be obtained from the adder/subtractor 14 in response to the output signal from the photodetector 12b. In the graph of FIG. 2, a point P represents the precise focus position (correct distance position) of the actuator 12a. A point F indicates the too-far position of the actuator 12a from the disc 10, while a point N denotes the too-close or too-near position of the actuator 12a to the disc 10. The distance region R bounded by the points N and F delineate the above-mentioned "focus pull-in range", and the movement of the actuator 12a is vertically controlled relative the disc surface so that a relative distance of the actuator 12a to the rotating disc 10 is within this region R. It should be noted that R1 and R2 represent the too-far region and too-near region, respectively.

For example, in the reproduction mode of the disc information, the auto-focus/focus servo controller 22 is made operative when the actuator 12a is sufficiently spaced from the rotating disc 10. This controller 22 first supplies a focus servo stop signal S1 and a search start signal S2 to the two analog switches 24 and 38, respectively. In response to these signals S1 and S2, analog switch 24 is rendered open, while the other switch 38 is rendered closed. At this time, the controller 22 supplies a search ON command signal S3 to the Miller integrator 32. Thus, the integrator 32 starts the charging operation. In waveform diagrams of FIG. 3, t1 indicates a charge start time point at this integrator 32. Before time t1, Miller integrator 32 has the given output. At time t1, output voltage V1 of the Miller integrator drops by a small amount thereby applying a negative voltage having the effect of initially moving the lens from its equilibrium position away from the disk surface. Output voltage V1 of the Miller integrator 32 gradually increases at a constantly increasing rate as denoted by a reference numeral 42 of FIG. 3A after this time point t1. This output voltage V1 of the integrator is input to the drive amplifier 26 of the servo system through the adder 30 and conductive analog switch 38. Thus, the actuator 12a gradually approaches the information plane of the rotating disc 10 in response to a signal whose level gradually increases and which is fed-back from the amplifier 26 to a coil (not shown) for positioning the actuator 12a.

When the actuator 12a reaches the too-far position F in the focus pull-in range of the servo loop described in FIG. 2, the focus-error signal 16 having the waveform shown in FIG. 4A is generated from the photodetector 12b through the adder/subtractor 14 where the cyclic surface oscillations of the disc surface, discussed below with reference to FIG. 5, are present. This signal 16 is supplied to the first and second comparators 18 and 20. In FIG. 4A 11 indicates a voltage level of a first reference voltage signal 44, which is simultaneously supplied to the first comparator 18 and represents the above-mentioned too-far level. Consequently, the first comparator 18 generates a too-far data signal 46, which is supplied to the controller 22. Responsive to this signal 46, the controller 22 supplies a hold command signal S4 to the Miller integrator 32, thereby causing the integrator 32 to stop its charging operation at the instant t2. Therefore, the level of the output voltage V1 of the integrator 32 is fixed and kept to the final voltage level as indicated by a numeral 48 in FIG. 3A. Thus, at this time t2, the movement of the actuator 12a is temporarily stopped.

At time t3 when a designated given time passes from the above-mentioned time t2, the controller 22 sends an ON command signal S5 to the analog switch 36 to be connected to the adder 30, thereby closing this switch 36. As a result of this, a voltage V2 having a predetermined voltage level is output from the voltage generator 34 and supplied to the adder 30 together with the voltage V1 from the integrator 32. The adder 30 adds these voltages V1 and V2 and this added voltage V3 is applied through the conductive switch 28 to the amplifier 26, where it is amplified and is supplied to the drive coil (not shown) of the actuator 12a. Thus, the actuator 12a further approaches the rotating disc 10 from the too-far position by only a constant distance ΔL corresponding to the above-mentioned additional voltage V2, so that it reaches the too-near position N in the focus pull-in range of the servo loop.

At this time, a focus error signal (16') having a waveform shown in FIG. 4B is detected by the photodetector 12b where the cyclic surface oscillations of the disc surface, discussed below with reference to FIG. 5, are present. This signal is supplied to the first and second comparators 18 and 20 in the same manner as above. In FIG. 4B, 12 indicates a voltage level of a second reference signal 50, which is simultaneously applied to the second comparator 20 and denotes the above-mentioned too-near position level. The focus error signal at this time has signal projecting portions exceeding both levels of the too-far level 11 and too-near level 12 as is obvious from FIG. 4B. Thus, the second comparator 20 generates a data signal 52 which simultaneously includes the too-near data and too-far data.

The reason why the focus error signal at the present operation stage has the waveforms of FIGS. 4A and 4B is as follows. The cyclic surface oscillation or dimple-like oscillation due to a warp of the disc surface occurs in the rotating disc 10 along the circumferential direction thereof. Consequently, the focus pull-in range R of the servo loop as previously described with reference to FIG. 2 oscillates at a cycle to be determined in dependence upon the rotation of the disc. FIG. 5 diagrammatically shows such an oscillation of the focus pull-in range R of the servo loop due to the surface oscillation of the rotating disc. In FIG. 5, when the actuator 12a is moved so as to approach the disc 10 and the actuator 12a reaches the position K1 as indicated by an arrow M1, the actuator 12a partially crosses a curve 56 indicative of the oscillating too-far position F as described above. Thus, the focus error signal of FIG. 4A is obtained between points a and b on this characteristic curve 56. Thereafter, when the actuator 12a further approaches the side of the disc 10 as shown by an arrow M2 of FIG. 5 and reaches the position K2, the actuator crosses an oscillating too-far region R1 at the intervals between points c-d and between points g-h, at the same time it crosses a too-near region R2 represented by a curve 58 showing the oscillating too-near position N at the intervals between points d-e and between points f-g. As a consequence, in this situation, the focus error signal having the waveform of FIG. 4B is supplied to the first and second comparators 18 and 20.

Now, returning to the description, when the above-mentioned data signal 52 is generated from the second comparator 20 and is supplied to the controller 22, it is confirmed by the controller 22 that two kinds of data such as the previously mentioned too-far data and too-near data were detected by the photodetector 12b. In FIG. 3, T represents the time necessary for this confirmation. At time t4 when this confirmation time T passes from time t3, the controller 22 supplies a servo operation command signal S1' to the analog switch 24, thereby making this switch 24 conductive. Now the focussing servo unit 40 is, accordingly, made operative. FIG. 3B shows the ON/OFF operations of this servo system 40.

The controller 22 recognizes on the basis of the output signal from the gain controller 23 that the focus servo open loop gain is gradually increased by the gain controller 23, as shown by a reference numeral 60 of FIG. 3C, and reaches a preselected level at time t5. At this time the controller 22 supplies a search end command signal S2' to the analog switch 38, thereby opening this switch 38. Thus, the addition of voltage V3 from the adder 30 is prevented (inhibited) from being applied to the amplifier 26 of the servo system 40. This causes the operation of the search system to be terminated or completed at time t5. In the manner as described above, the actuator 12a is pulled in the servo loop. Thereafter, an ordinary focus-servo operation is executed.

During the search mode before applying the focussing servo, the search drive voltage is converted into a position deflection amount of the actuator 12a by the voltage detector 28 and is being supplied to the controller 22 and is monitored by this controller 22. In the auto-focussing system of FIG. 1, the case could be caused where the focus error signal 16 having the waveform shown in FIG. 4A is not transmitted to the comparators 18 and 20 due to some external causes (e.g., malfunction of the optical system) in spite of the fact that the actuator 12a moved so as to reach the position where it enters the above-described focus pull-in range of the servo loop. In this case, the controller 22 immediately stops the above-mentioned control operation thereof and returns the actuator 12a to the initialization position. This reliably prevents the objective lens (not shown) of the pickup part which moves along with the actuator 12a from colliding with the surface of the rotating disc 10. Furthermore, even in the case where the too-near data is not obtained within the before-mentioned time period T after the too-far data signal 46 has been generated, the controller 22 senses that an abnormality has occurred in the system and stops the searching operation of the actuator 12a and returns it to the initial state similarly to the above case.

According to the auto-focussing system of the present invention, it is always monitored by the controller 22 so that no malfunction occurs in the constituent parts of the system. A malfunction can be detected by checking whether or not the focus error signal is generated at a proper time and/or whether or not the too-near data is generated together with the too-far data within the time period T of FIG. 3. Furthermore, according to the present invention, the approaching of the actuator (or objective lens) to the rotating optical disc 10 is divided into two steps. Namely, this approaching operation is carried out under the control of the controller 22 in the manner such that as the first step, when the actuator 12a reached the too-far side position of the servo loop, its movement is temporarily stopped and thereafter as the second step, the actuator 12a is moved from this position toward the disc 10 by only a constant approaching distance ΔL to be determined in response to the fixed voltage which has been present in the voltage generator 34. Therefore, it is possible to reliably prevent the occurrence of defocussing which has been caused with well known apparatus. Furthermore, malfunction of the system resulting in, for example, collision of the objective lens with the disc surface is prevented. Consequently, the position control of the objective lens is satisfactorily performed to focus the light spot on the information plane of the record carrier body, thereby enabling the lens to be safely moved within the focus pull-in range of the servo loop.

Although the present invention has been shown and described with respect to a particular embodiment, various changes and modifications which were obvious to a person skilled in the art to which the invention pertains are deemed to lie within the spirit and scope of the invention.

What is claimed is:
1. An auto-focusing system, comprising:
 (a) light radiator means for radiating a light beam so as to form a light spot on an information plane of a rotating optical type information record carrier body, said light radiator means being controllably movable along a line substantially perpendicular to said information plane;

(b) focus servo means for moving said light radiator means along said line so that the distance between said light radiator means and said information plane is within a designated distance interval to thereby satisfactorily focus the light spot on said information plane, said designated distance interval being defined between a too-far position as the point most distant from said record carrier body within said designated distance interval and a too-near position as the point closest to said record carrier body within said designated distance interval; and (c) controller means for inhibiting said focus servo means when the light radiator means approaches said record carrier body from a distance beyond the too-far position, for temporarily stopping the movement of said light radiator means when the light radiator means reaches said too-far position, and for causing said light radiator means to further approach said carrier body from said too-far position by only a predetermined distance so as to be located in a second position, thereby locating said light radiator means within said designated distance interval to prevent an approach of the light radiator means which results in its colliding with said record carrier body.

2. The auto-focussing system according to claim 1, wherein said control means comprises:
first voltage generator means for generating a first voltage having a voltage level which increases in relation to the positional movement of said light radiator means; and
drive means for moving said light radiator means so as to approach said record carrier body in response to an increase in said first voltage.

3. The auto-focussing system according to claim 2, wherein said control means further comprises:
second voltage generator means for generating a predetermined fixed second voltage;
adder means connected to said first and second voltage generator means for adding said first and second voltages; and
first switch means, provided between said second voltage generator means and said adder means, for controlling the transmission of said second voltage to said adder means.

4. The auto-focussing system according to claim 3, wherein said control means further comprises:
controller means, connected to said first voltage generator means, said first switch means and said drive means, for generating a first focus error signal generated when said light radiator means reaches said too-far position, and for causing said first voltage generator means to stop the increase of said first voltage and to hold a last voltage level, thereby preventing said drive means from further driving said light radiator means.

5. The auto-focussing system according to claim 4, wherein said controller means generating a second focus error signal when said light radiator means reaches said second position and determines whether said second focus error signal includes data indicating that said light radiator means crosses both said too-far position and said too-near position due to a surface oscillation of said rotating record carrier body, and when this determination is positive, inhibiting the transmission of an output voltage from said adder means to said drive means, thereby causing said light radiator means to be stopped in said second position.

6. The auto-focussing system according to claim 5, wherein said controller means controls said drive means to return said light radiator means to its initial state beyond the designated distance interval when said determination with respect to whether said second focus error signal includes both of said too-far data and too-near data is negative in spite of the fact that said light radiator means has reached the second position.

7. The auto-focussing system according to claim 6, wherein said controller means comprises:
a microprocessor;
first comparator means for receiving said first focus error signal and for comparing said first focus error signal with a first reference voltage preselected such that said first focus error signal electrically represents said too-far position; and
second comparator means for receiving said second focus error signal and for comparing said second focus error signal with a second reference voltage preselected such that said second focus error signal electrically represents said too-near position.

8. The auto-focussing system according to claim 7, which further comprises:
a signal amplitude scaling means connected to said light radiator means and said controller means for generating an output voltage used by said controller means to attenuate said first voltage generator means.

9. The auto-focussing system according to claim 8, wherein said controller means determines on the basis of the output voltage from said signal amplitude scaling means that a focus servo open loop gain defined by said focus servo means is gradually increased to reach a predetermined level corresponding to the too-near position.

10. An auto-focussing method comprising the steps of:
(a) controlling a light radiating device, which radiates a light beam so as to form a light spot on an information plane of a rotating optical type information record carrier body, to move along a line substantially perpendicular to said information plane;
(b) moving said light radiating device along said line so that a distance between said light radiating device and said information plane is within a designated distance region to thereby satisfactorily focus the light spot on said information plane, said interval being defined between a too-far position as the point most distant from said record carrier body within said interval and a too-near position as the point closest to said record carrier body within said designated distance interval;
(c) temporarily stopping the movement of said light radiating device when the light radiating device approaches said carrier body from beyond said interval as it reaches the too-far position; and
(d) further moving said light radiating device from said too-far position by only a predetermined distance so as to locate it in a second position and thereby causing said light radiating device to be located within said designated distance interval.

* * * * *

UNITED STATES PATENT AND TRADEMARK OFFICE
CERTIFICATE OF CORRECTION

PATENT NO.  :  4,683,560
DATED       :  July 28, 1987
INVENTOR(S) :  T. TAKEUCHI et al It is certified that error appears in the above-identified patent and that said Letters Patent is hereby corrected as shown below:

In the Title Page of Patent, Assignee's name should read as follows:

--Olympus Optical Co., Ltd.--

Signed and Sealed this

Third Day of May, 1988

Attest:

DONALD J. QUIGG

Attesting Officer

Commissioner of Patents and Trademarks